United States Patent [19]
Woo

[11] Patent Number: 5,473,200
[45] Date of Patent: Dec. 5, 1995

[54] FREQUENCY MODULATION DIGITAL CODE ANTI-THEFT SYSTEM

[75] Inventor: Thomas Woo, Hong Kong, Hong Kong

[73] Assignee: Depromax Limited, Hong Kong

[21] Appl. No.: 133,611

[22] Filed: Oct. 8, 1993

[51] Int. Cl.⁶ .................................................. B60R 25/00
[52] U.S. Cl. .................. 307/10.2; 180/287; 340/310.01; 340/825.32; 340/825.69
[58] Field of Search ................................. 307/10.1–10.6; 361/171, 172; 180/287, 286; 70/278, 264, 241; 340/825.3–825.32, 825.34, 825.54, 825.69, 825.71–825.73, 825.77, 426, 430, 310.01, 310.02, 310.06

[56] References Cited

U.S. PATENT DOCUMENTS

| | | | |
|---|---|---|---|
| 3,242,460 | 3/1966 | Morrell | 180/287 |
| 4,151,507 | 4/1979 | Willis | 180/287 |
| 4,288,778 | 9/1981 | Zucker | 340/815.44 |
| 4,636,651 | 1/1987 | Kilgore | 307/10.3 |
| 4,641,124 | 2/1987 | Davis | 340/426 |
| 4,688,036 | 8/1987 | Hirano et al. | 340/825.69 |
| 4,689,603 | 8/1987 | Conigliaro et al. | 307/10.4 |
| 4,758,835 | 7/1988 | Rathmann et al. | 340/825.31 |
| 4,761,631 | 8/1988 | Hwang | 340/426 |
| 4,792,792 | 12/1988 | Costino | 180/287 |
| 4,928,098 | 5/1990 | Dannhaeuser | 340/825.69 |
| 4,992,670 | 2/1991 | Pastor | 180/287 |
| 5,055,701 | 10/1991 | Takeuchi | 307/10.2 |
| 5,142,278 | 8/1992 | Moallemi et al. | 307/10.1 |
| 5,229,648 | 7/1993 | Sues et al. | 307/10.1 |
| 5,315,286 | 5/1994 | Nolan | 340/426 |

*Primary Examiner*—William M. Shoop, Jr.
*Assistant Examiner*—Richard T. Elms
*Attorney, Agent, or Firm*—Townsend and Townsend and Crew

[57] ABSTRACT

A theft prevention device that includes a digital control unit and digital receiving units. These digital components form a control system along with existing peripheral components. The control system utilizes a signal network where signals are transmitted and received on the existing wiring or through the air between the digital components. The components of the anti-theft device operate in either an armed or disarmed state, and the system automatically arms whenever the ignition key is turned from on to off. If the system is in a vehicle and the vehicle is started without disarming the system first, each component becomes active after its programmed time delay has elapsed. A unique code, generated by the digital control unit, is passed through alarm system's signal network during the disarmed state such that the digital components in the theft prevention device becomes active and perform their respective functions even if the power supply is cut in the armed state.

23 Claims, 8 Drawing Sheets

FREQUENCY MODULATION DIGITAL CODE ANTI-THEFT SYSTEM

BACKGROUND OF THE INVENTION

The present invention relates to theft prevention and more particularly to electronic theft prevention that uses existing wiring in an automobile.

Presently, many individuals have alarm systems installed in their automobiles in order to deter theft and vandalism. Alarm systems evolve in complexity as the abilities of thieves and vandals improve.

The present state of the art in automobile alarms is to include a digital control unit attached to peripheral equipment which implements various anti-theft features. This equipment usually includes an ignition disable and a siren. For most alarm systems, it is desirable to hide the location of these devices to prevent the thief from discerning their location and defeating their operation.

Unfortunately, installation of these devices requires that installers run new wiring to interconnect the components (e.g., U.S. Pat. Nos. 4,792,792, 4,992,670 and 5,061,915). This extra wiring is a tell-tale sign allowing the devices' hiding places to be discovered. In addition, the wiring as an add-on may be unsightly, and in some instances, the attaching of additional wiring is difficult or impossible. Finally, the extra wiring provides another weak link in the alarm system because many alarm functions are disabled by cutting particular wires of the system (e.g., the newly added wires which provide a medium for the transmission and reception of signals between the various components of the alarm system). Often, a controller for an alarm system is a relatively large box, having many wires connecting the controller to various sensors and actuators. For conventional systems, signals are sent on analog format or in "on/off" format. To preserve integrity of such a prior art system, the controller must be well-hidden, as well as the wires heading up to it, because disconnection of the additional wires will disable the theft system.

Examples illustrating difficult wiring situations in automotive vehicles include (1) adding wiring between the engine compartment and the passenger compartment and (2) adding power door locks or window functions to the alarm system. When wiring from the engine compartment enters the passenger compartment, it must pass through a grommet such that the majority of the environment and noise from the engine compartment is deterred from entering the passenger compartment. This grommet has scant spare room for the addition of wiring for an alarm system. To install wiring for the control of power locks and windows, the vehicles doors must be dismantled and then reassembled.

SUMMARY OF THE INVENTION

The present invention provides a simple, cost-efficient and reliable theft prevention system. The system is effective not only in automobiles, but is applicable to vehicles of all types such as motorcycles and boats, and to security systems for the home.

The preferred embodiment of the theft prevention device includes a number of novel elements for providing a theft prevention system for an automobile. The preferred embodiment has several digital components, forming a digital control system, which are attached to existing peripheral components, such as horns and door locks. For new components, splicing into the nearest wiring cables that are part of the existing network of wires of the automobile provides communication with the other elements of the alarm system, and also provides power to any components as needed.

The control system uses a signal network with signals transmitted and received between the digital components without requiring additional wiring throughout the vehicle.

The components of the anti-theft device operate in either an disarmed or armed state (first or second state), with the system automatically arming itself whenever the ignition key is turned from on to off. If the vehicle is started without disarming the system first, each component becomes active after its programmed time delay has elapsed. A unique digital code (the code word), containing an ID code, is sent to the digital control system each time the system switches from armed to disarmed. This code word protects the system from unwanted tampering because the code word is passed through the alarm system's signal network only during the disarmed state. This allows the digital components in the theft prevention device to become active and perform their respective functions when required even if the wire carrying the code word in the security system network (usually the power supply wire) is cut while the system is in the armed state.

One advantage of this anti-theft system is that because the system is established as a network, many enhanced features are available. For example, (1) the components can be polled to verify their presence in the vehicle or their status and/or (2) different features of the alarm system can be selectively activated at different times.

The features of the anti-theft system include use of an existing wiring system which facilitates the alarm installation process thereby providing a design which is difficult for the thief to attack and disarm and a digital code for deactivation of components of the system. Other features and advantages of the present invention will become apparent to one skilled in the art by reading the following specification and by reference to the following drawings.

BRIEF DESCRIPTION OF THE DRAWINGS

FIG. 10 is a timing diagram showing a preferred implementation of transmitters of alarm system 100. To reduce collisions of sensor information sent to CPU 115, each transmitter issues its data at a preset interval. These intervals are different for each sensor and effectively minimize overlap between data sent from different sensors. As shown, each series of signals, one from each transmitter, has an interval that ensures there is no collision for the second signal even when all start to transmit at one time. For an economical system, only CPU 115 includes both a transmitter and receiver, while other components include only a transmitter or a receiver.

DESCRIPTION OF THE PREFERRED EMBODIMENT

Figure 1:
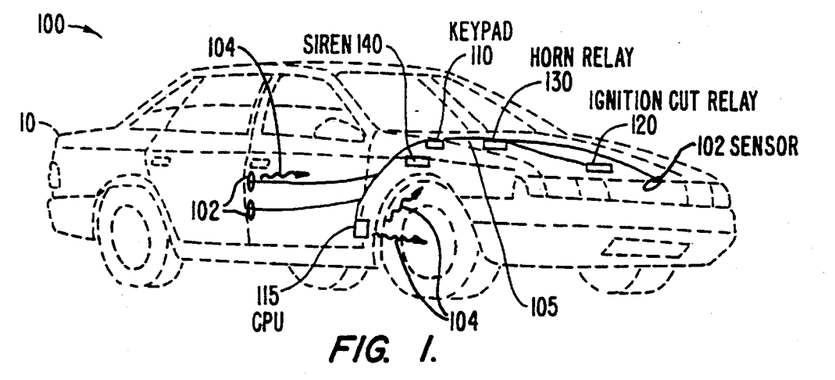
FIG. 1 is an automotive vehicle depicting the major components of the alarm system.

FIG. 1 is an automotive vehicle 10 depicting the major components of alarm system 100. In the preferred embodiment, alarm system 100, located in automotive vehicle 10 having pre-existing wiring 105, includes a key pad 110, a digital control unit or CPU 115, a digital ignition-cut relay 120, a digital horn relay 130 and a digital self-powered siren 140.

Key pad 110 (preferably a 6-digit type key pad) is located near the driver's door such that it is readily accessible to the driver. CPU 115 for alarm system 100 can be placed anywhere in vehicle 10 that is preferably protected from the outside environment. CPU 115 interfaces to a number of peripheral units by establishing a signal network over existing wiring 105 allowing its use as a communication channel for alarm system 100.

This signal network allows the signals between the various components of alarm system 100 to be sent along the existing wires that also carry the signals originally meant for those wires. A split frequency technique, can be used to implement this type of signal network. For example, CPU 115 uses a particular frequency to send data and control information to the peripheral units, while the sensors are a second frequency to send data back to CPU 115.

The peripheral units of alarm system 100 are incorporated with the standard equipment in vehicle 10. These peripheral units, in the preferred embodiment, include immobilizers and sirens (e.g., digital ignition cut relay 120, digital horn relay 130 and digital self-power siren 140). Further, for these additional components, splicing into existing wiring 105 at the closest point provides access to the network and the communication needed for the alarm network. Alternatively, access to the network and the communication needed for the alarm network may be through wireless signals 104 transmitted through the air. The peripheral units are digital components that house digital receivers, and they include existing apparatus (e.g., vehicle 10's horn) or added apparatus (e.g., a siren).

In operation, alarm system 100 is a digital system. CPU 115, in the preferred embodiment, receives inputs from various areas including the doors, hood, trunk and other places with sensors 102 that can indicate a disruption. CPU 115 determines a state for alarm system 100 (armed or disarmed), and it then issues commands for particular functions accordingly. Remote digital components 120, 130 and 140, can include an internal battery supply in addition to any required intelligence to respond to digital codes or be powered from the network.

These digital components can become engaged or disengaged depending on their settings when CPU 115 sends them an appropriate signal. Selective activation and deactivation provides many operational modes for alarm system 100. For example, some components remain on or off, at the installer's option, until receiving the appropriate code. Another option is that a digital component is initially in one state and then later switches to another state unless a code is received within a particular time from some action, such as starting vehicle 10. For example, a siren may be off, but becomes active unless a particular code is received from the controller within a predetermined time period. Digital ignition cut relay 120, digital horn relay 130 and digital self-power siren 140 mentioned in this detailed description are only examples of various components which can be used in this alarm system to stop and deter theft.

Figure 2:
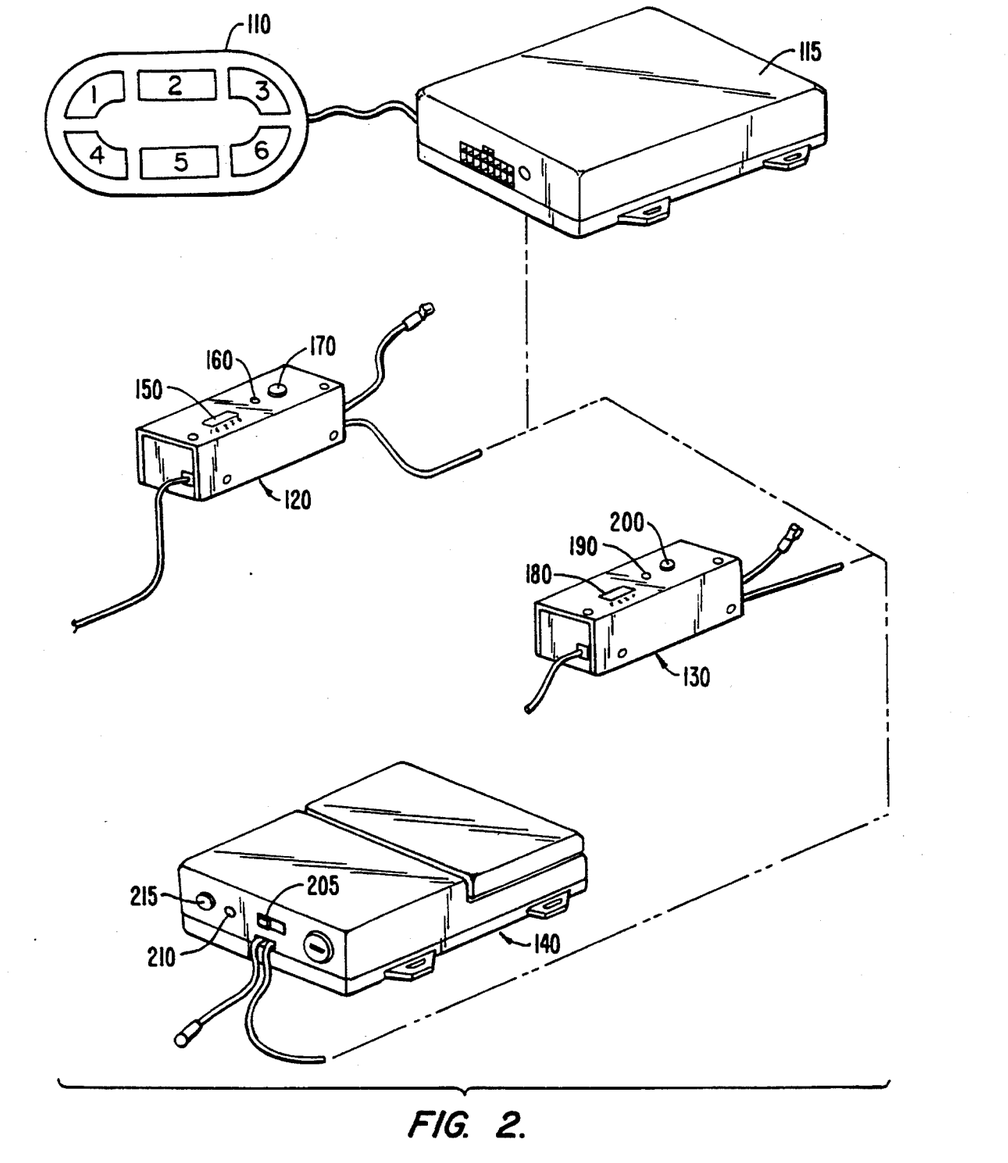
FIG. 2 is a diagram of the components of alarm system.

FIG. 2 is a diagram of the components of alarm system 100. Alarm system 100 includes key pad 110, CPU 115, digital ignition cut relay 120 with delay time select 150, LED 160 and learn code button 170, digital horn relay 130 with delay time select 180, LED 190 and learn code button 200, and digital self-power siren 140 with delay time select 205, LED 210 and learn code button 215.

In the preferred embodiment, key pad 110 sends manual inputs directly to CPU 115. A unique digital code signal (the code word) is transmitted from CPU 115 to the other digital components (digital ignition cut relay 120, digital pulse horn relay 130 and digital self-power siren 140 in the preferred embodiment) over power cables in vehicle 10's existing wiring system 105. Note that key pad 110 is only one way that the system can be disarmed. Other methods, such as a special remote transmitter that can send a disarm signal or an encoded key that is inserted into a receptacle.

Because vehicle 10's existing wiring 105 is used, installers do not have to run wires between CPU 115 and other digital relays and siren 120, 130 and 140. Moreover, relays and siren 120, 130 and 140 can be easily hidden which makes it more difficult for the thief to find and disable them. Vehicle 10's existing wiring 105 is also used to connect digital ignition cut relay 120 to (1) the ignition coil, (2) the fuel pump or (3) the ignition system, and to connect digital horn relay 130 to the horn switch.

Digital ignition cut relay 120 has delay time select 150, LED 160 and a learn code button 170, all of which are visible on the digital ignition cut relay component 120. Digital horn relay 130's and digital self-power siren 140's visible features also include delay time selects 180 and 205, LEDs 190 and 210 and learn code buttons 200 and 215. Learn code buttons 170, 200 and 215 receive the required digital codes from CPU 115. This process is described in greater detail below.

To stop car thieves from using the control unit of one alarm system to deactivate digital components 120, 130 and 140 of another alarm system, a unique system digital code (an ID code) is used for CPU 115 of alarm system 100. This code is installed in CPUs 115 during manufacturing through use of an EEPROM.

Digital components of the alarm system 120, 130 and 140 are programmed to have the same code after they have been installed. This is achieved by pressing each of the learn code buttons on various digital components 120, 130 and 140 while CPU 115 is emitting alarm system 100's code word. The ID code from the code word is then entered into a memory in each of the digital components of alarm system 120, 130 and 140. Each time the ignition key is turned from off to on, digital components 120, 130 and 140 enter an activated state until a code that matches the ID code in the memories of digital components 120, 130 and 140 has been received from CPU 115. This method prevents a thief from compromising the alarm system by destroying CPU 115 while the alarm is activated. That is, all systems are armed, in the preferred embodiment, until CPU 115 issues a valid disarm code.

Delay time selects 150, 180 and 205 can be manually set to delay activation for 0, 1, 3 or 9 minutes after the armed state of alarm system 100 is disrupted. The delay time selects typically are determined prior to installation.

When alarm system 100 is armed, an LED on pad 110 blinks slowly. To disarm alarm system 100, a 4–6 digit disarm code must be manually entered into alarm system 100 through pad 110. The 4–6 digit disarm code can be programmed into alarm system 100 by the user. If vehicle 10 is driven without the disarm code, vehicle 10 will stop and the horn and siren will sound after the preset delay times elapse. If the correct sequence of digits for the disarm is not detected from key pad 110 within the first twelve tries, alarm system 100 locks and will receive no more codes from key pad 110 until the ignition key is turned on and then off. If vehicle 10 is started without disarming alarm system 100 first, the LED on key pad 110 blinks rapidly and beeping sounds occur to warn the driver that alarm system 100 has not been disarmed. In addition, if the power supply to CPU 115 is disconnected or if CPU 115 is destroyed, all digital relays and siren 120, 130 and 140 will not receive the required disarm code and, therefore, will become active and perform their respective functions when vehicle 10 is started or a disruption occurs.

Figure 3:
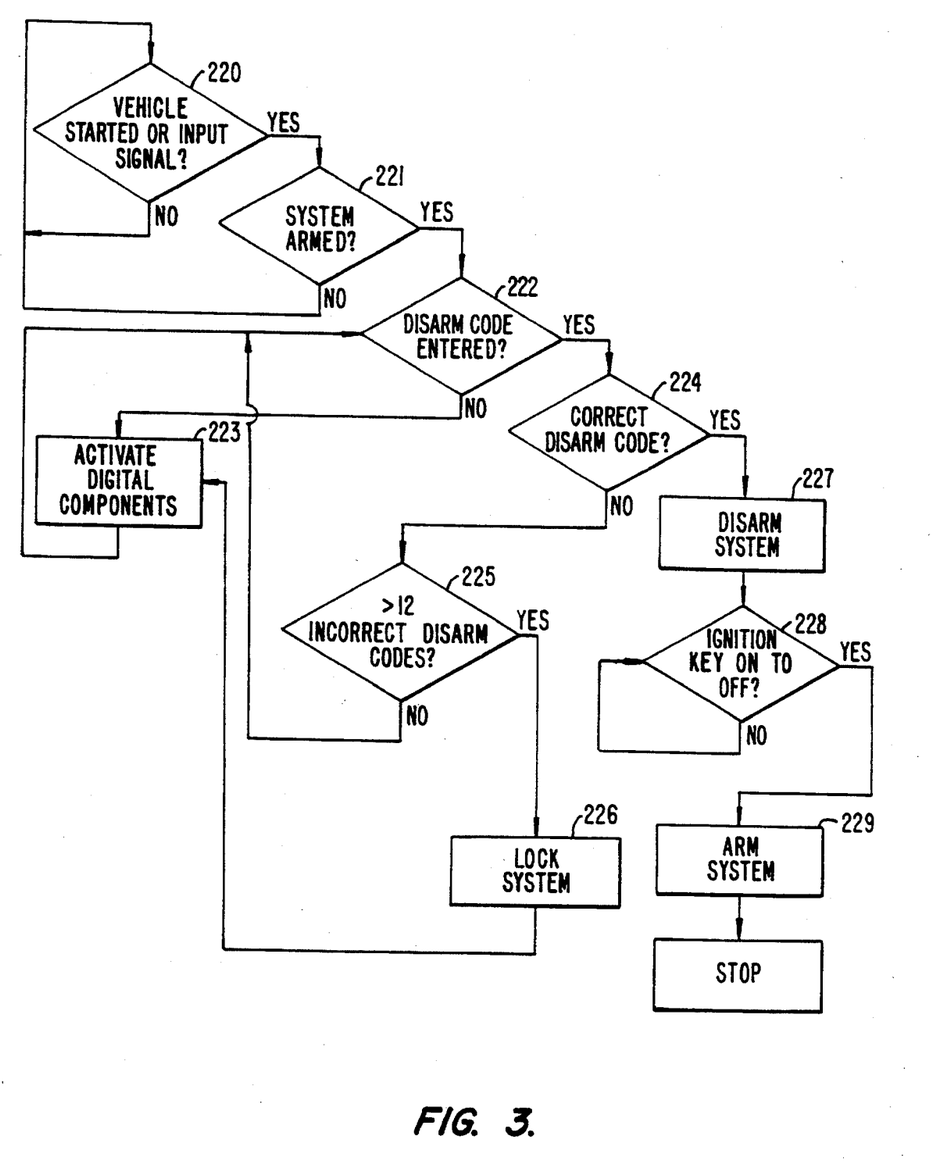
FIG. 3 is a process flow chart for the alarm system.

FIG. 3 is a process flow chart for alarm system 100. In the preferred embodiment, the flow chart begins at step 220. Step 220 determines if vehicle 10 is started (ignition key turned from off to on) or an input signal is received from the door, hood, trunk or other place located in vehicle 10 with an input sensor. If vehicle 10 was not started and there was no disturbance, then system 100 returns to step 220. If vehicle 10 was started or if there was a disturbance, then system 100 advances to step 221. Step 221 determines if the system is armed. If system 100 is not armed, then system 100 returns to step 220. If system 100 is armed, then system 100 advances to step 222. Step 222 determines if a disarm code has been entered. If a disarm code has not been entered, then digital components are activated 223 after their respective time delays have elapsed until the correct disarm code is entered. If a disarm code has been entered, then step 224 determines if the disarm code entered is the correct disarm code. If an incorrect disarm code is entered, step 225 determines if more than twelve incorrect disarm codes have been entered consecutively. If fewer than twelve incorrect disarm codes have been entered, then system 100 returns to step 222. If more than twelve incorrect disarm codes have been entered, then system 100 locks itself (step 226) (alarm system 100 receives no more codes from the key pad until the ignition key is turned from on to off) and digital components are activated (step 223) after their respective time delays have elapsed. If the correct disarm code is entered, then system 100 disarms itself (step 227). Step 228 determines if the ignition key has been turned from on to off. If the ignition key is not turned from on to off then system 100 returns to step 228. If the ignition key is turned from on to off then system 100 arms, step 229.

Figure 4:
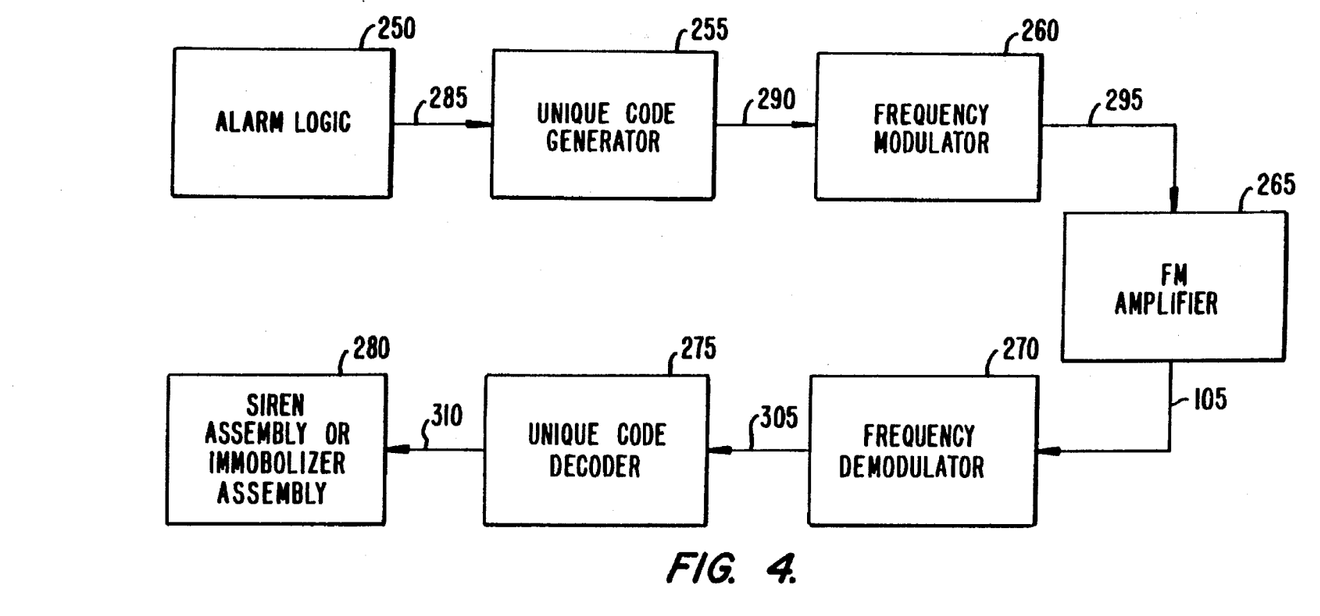
FIG. 4 is a signal flow chart for the alarm system.

FIG. 4 is a signal flow chart for alarm system 100. The flow chart begins with alarm logic 250 which determines when to send a signal to siren(s) and/or immobilizer(s) 280 in order to deactivate them. Alarm logic 250 sends analog signal 285 to code word generator 255 where the code word is generated from the ID code stored in alarm system 100's computer non-volatile memory. The code word is then transmitted in binary form 290 to frequency modulator 260 where the binary coded signal is converted into frequency modulated ("FM") signal 295. FM signal 295 is then amplified onto existing wiring 105 by FM Amplifier 265 so it can be transmitted to and received by siren(s) and/or immobilizer(s) 280. Inside siren(s) and/or immobilizer(s) 280, frequency demodulator 270 demodulates the received FM signal 105 and converts it back into binary form 305 before passing it to code word decoder 275. Decoder 275 extracts the ID code from the received binary code signal 305 and compares it with the ID code in the computer's non-volatile memory. When an exact match is found, analog signal 310 is generated to deactivate siren(s) and/or immobilizer(s) 280.

Figure 5:
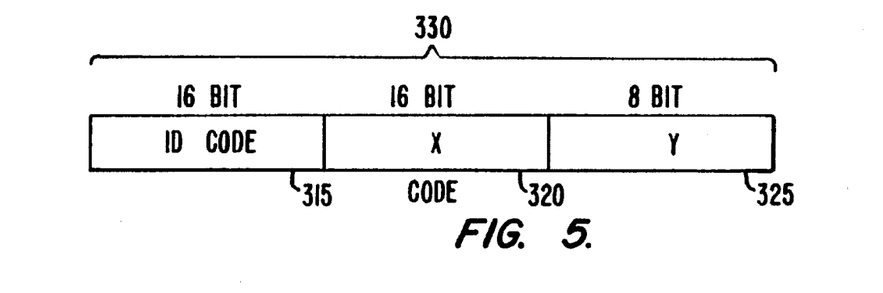
FIG. 5 illustrates how the code word used in the alarm system is formed.

FIG. 5 illustrates how code word 330 used in alarm system 100 is formed. In the preferred embodiment, the ID code of each alarm system 100 is stored in the non-volatile electrically erasable programmable read-only memory ("EEPROM") of each component in alarm system 100. This enables the ID code to remain intact even when a power failure occurs. ID code 315 and value x, which is factory preset as 1, are programmed into the EEPROM of CPU 115 unit during manufacturing. A formula along with value x is used to calculate an 8-bit check code, y or the f(x), where x originally equals 1 and is incremented by 1 (x+1) each time alarm system 100 switches from arm to disarm. ID code 315 combined with x and y forms code word 330. When code word 330 is received by one of the digital components of the alarm system 120, 130 and 140, it is treated as a valid disarm code only when: (1) ID code 315 matches, (2) the new x is bigger than the x in the memory, and (3) the f(x) resulting from its pass through the formula is the same as the y which is extracted from the received code word 330. This allows use of a temporary disarm code to prevent parking attendants and the like from learning a code when alarm system 100 is disarmed and then reusing that old code later in an attempt to disarm alarm system 100 and steal vehicle 10.

Figure 6:
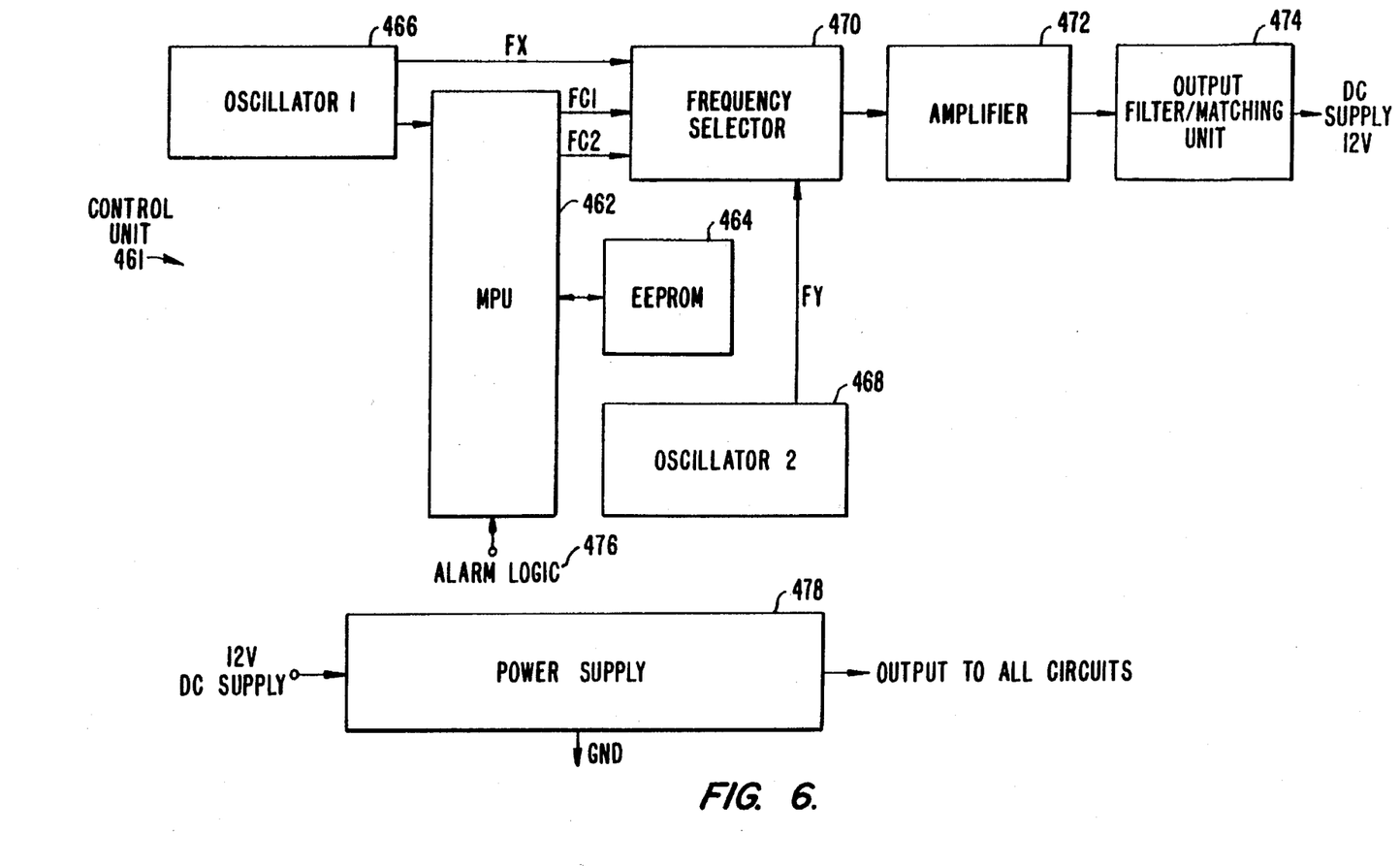
FIG. 6 is a block diagram of the control unit.

FIG. 6 is a block diagram of control unit 461. Control unit 461's main function is to use the coded, existing wiring 105 transmitted signal to send the disarm code to the distributed parts making up alarm system 100. Control unit 461 contains code generator 255, frequency modulator 260 and FM amplifier 265. This unit consists of a MPU 462, EEPROM device 464, two crystal-controlled oscillators 466 and 468, a frequency selector 470, a final amplifier 472, an output filtering/matching unit 474, and power supply 478. As previously stated, alarm logic 476 facilitates the determination of whether alarm system 100 is armed or disarmed. The code word 330 is only generated when alarm system 100 is disarmed. Moreover, the newly formed code word is transmitted only while in the disarmed state so that if alarm system 100 is destroyed or the power to alarm system 100 is later disrupted while in the armed state, all the other alarm components remain active and perform their respective functions because they have already received the newly generated code during the previous disarmed state.

When an ON signal is received from alarm logic 476 by MPU 462, MPU 462 reads the disarm code from EEPROM device 464 and sends it to two control inputs FC1 and FC2 of frequency selector 470. In frequency selector 470, signals at FC1 and FC2 select two oscillation frequencies Fx and Fy as the selector output. The output signal, after amplification and filtering/matching, is fed to alarm system 100 power supply leads. Vehicle 10 contains several noise generating sources such as the fuel pump, generator, etc. which make interference a serious consideration. After amplification, the signal is strong enough to be received by the other components of alarm system 100, but weak enough not be transmitted onto the air.

Figure 7:
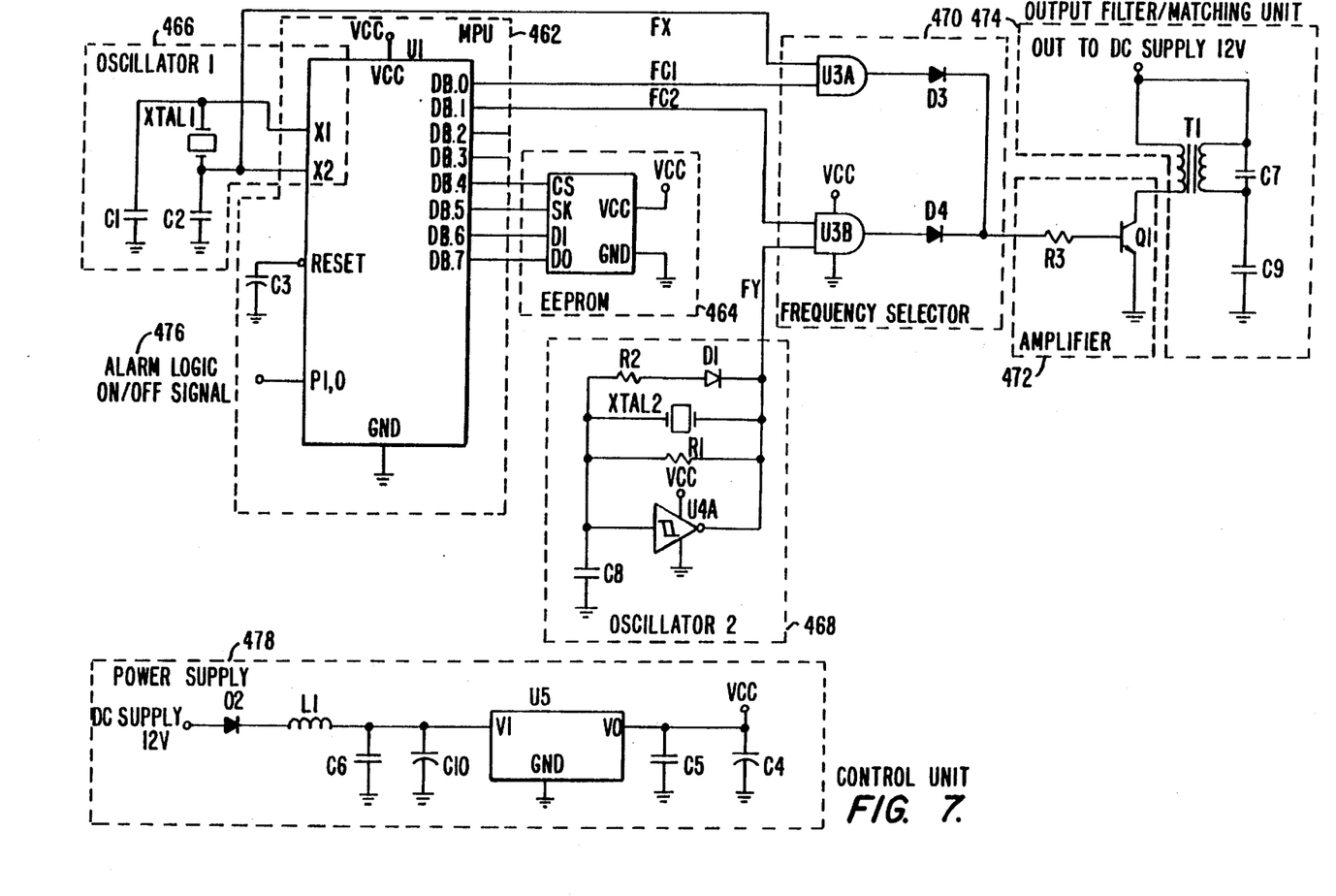
FIG. 7 is a schematic circuit diagram for the control unit.

FIG. 7 is a schematic circuit diagram for control unit 461. Power supply 478, a DC 12 volt supply, is applied to the 12 volt to 5 volt regulator for control unit 461. Diode D2 prevents reverse polarity from damaging the unit. The filter formed by inductor L1, capacitor C6 and capacitor C10 filters out the variation on the supply line. Integrated circuit U5 (can be a LM7805 or its equivalent) regulates the voltage down to 5 volts, and extra filtering is provided by capacitors C5 and C4.

The generated 5 volt supply is fed to MPU 462, oscillators 466 and 468, and frequency selector 470. Integrated circuit U1 in MPU 462 has built-in custom software and is clocked via a standard circuit formed by crystal Xtal1, capacitor C1 and capacitor C2 in first oscillator 466. The frequency of crystal Xtal1 is also used as frequency Fx mentioned above. Another crystal controlled oscillator 468 is formed by Schmitt Trigger U4A, crystal Xtal2, resistor R1 and capacitor C8. Resistor R1 and capacitor C8, within second oscillator 468, delay feedback in order to cause oscillation so the crystal can force a definite oscillation frequency resistor R2 and diode D1 are used to enable the output to have a 50% duty cycle.

After receiving the signal from alarm logic 476, MPU 462 retrieves the ID code and the increment code (x) from EEPROM device 464. The increment code (x) is then incremented by one and again stored in control unit 461's EEPROM device 464. MPU 462 then calculates the 8-bit check code (y) using the ID code and the increment code (x), and then sends the disarm code (code word) to the MPU's two output lines which are connected to FC1 and FC2 of frequency selector 470. Three of the four different states on these two output lines are used to select Fx, Fy and OFF. The remaining state on these two lines is not utilized.

Frequency selector 470 consists of two AND gates U3A and U3B which act as gating for frequencies Fx and Fy with control signals from MPU 462 via lines FC1 and FC2. The Outputs of these two AND gates are combined using two diodes D3 and D4 before they are fed to the amplifier via resistor R3. The amplifier is formed by a NPN transistor Q1 operating in the switching mode. The collector of the transistor is loaded with a transformer resonator T1 which feeds into the DC supply leads via its secondary winding (capacitors C9 and C7). Capacitor C9 is used to block the DC voltage while capacitor C7 is used to tune the resonator at it operating frequency.

Figure 8:
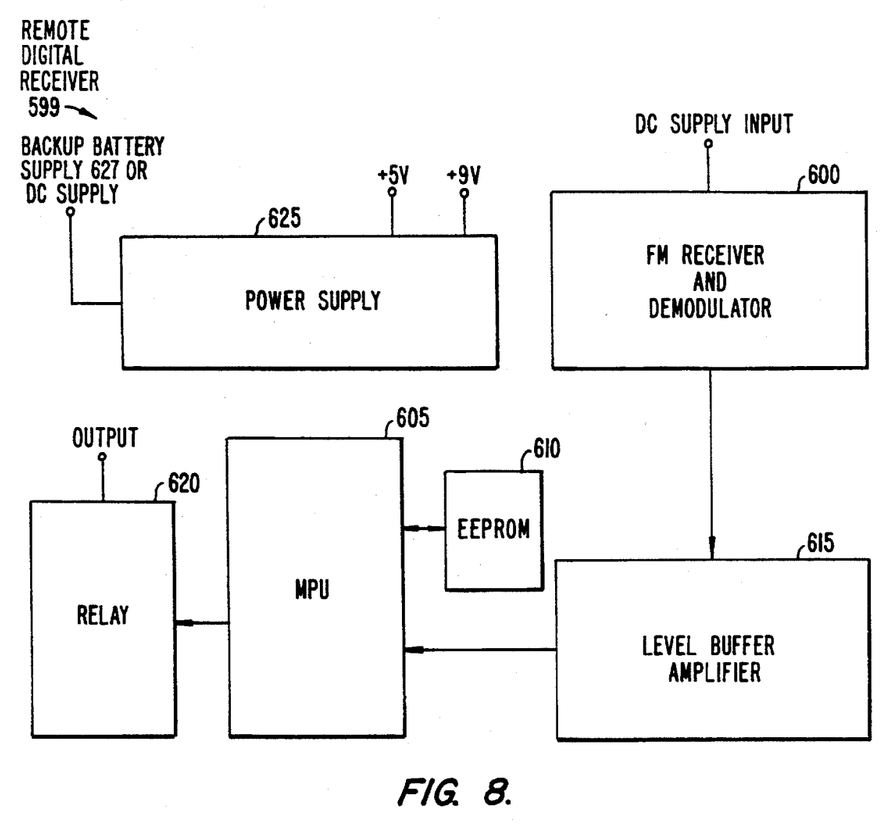
FIG. 8 is a block diagram of the remote digital receiver.

FIG. 8 is a block diagram of remote digital receiver 599. Digital receiver 599 contains frequency demodulator 270 and code decoder 275, and it receives the signal sent throughout vehicle 10 by control unit 461. The same power source can be used for both control unit 461 and digital receiver 599. In an alternate embodiment, digital receiver 599 may include a backup battery supply 627. In the preferred embodiment, digital receiver 599 is located inside digital ignition cut relay 120, digital horn relay 130 and digital self-power siren 140 of alarm system 100. Remote digital code receiver 599 disarms the security function in the digital component when the correct disarm ID code is received from control unit 461. This occurs until the main power is turned off. Only when a valid code is received will the remote digital code receiver cause its unit to become disarmed.

For FM receiver and demodulator 600, the DC power supply 625 is stepped down to 9 volts. This 9 volt supply is further stepped down to 5 volts for MPU 605, EEPROM 610, and level buffer amplifier 615. When power up takes place, MPU 605 enters a monitor mode controlled by an internal software program. FM receiver and demodulator 600 continuously decodes signals from the supply leads, sends these signals to the level buffer amplifier which increases the amplitude, and conditions the signals such that they are suitable for monitoring by MPU 605. MPU 605 is continuously monitoring the digital input and checking for a correct match of the disarm code. Once the disarm code has been identified, MPU 605 turns on its output relay 620 and enters a latched state until the main power is turned off. The siren, however, requires a special set up because it can be a nuisance to have the siren sound whenever the circuit is powered up. Therefore, a time delay of five seconds is incorporated into its operation to disable the siren upon the initial power up. Within these five seconds, control unit 461 has enough time to send the disarm code to turn off the siren.

Figure 9:
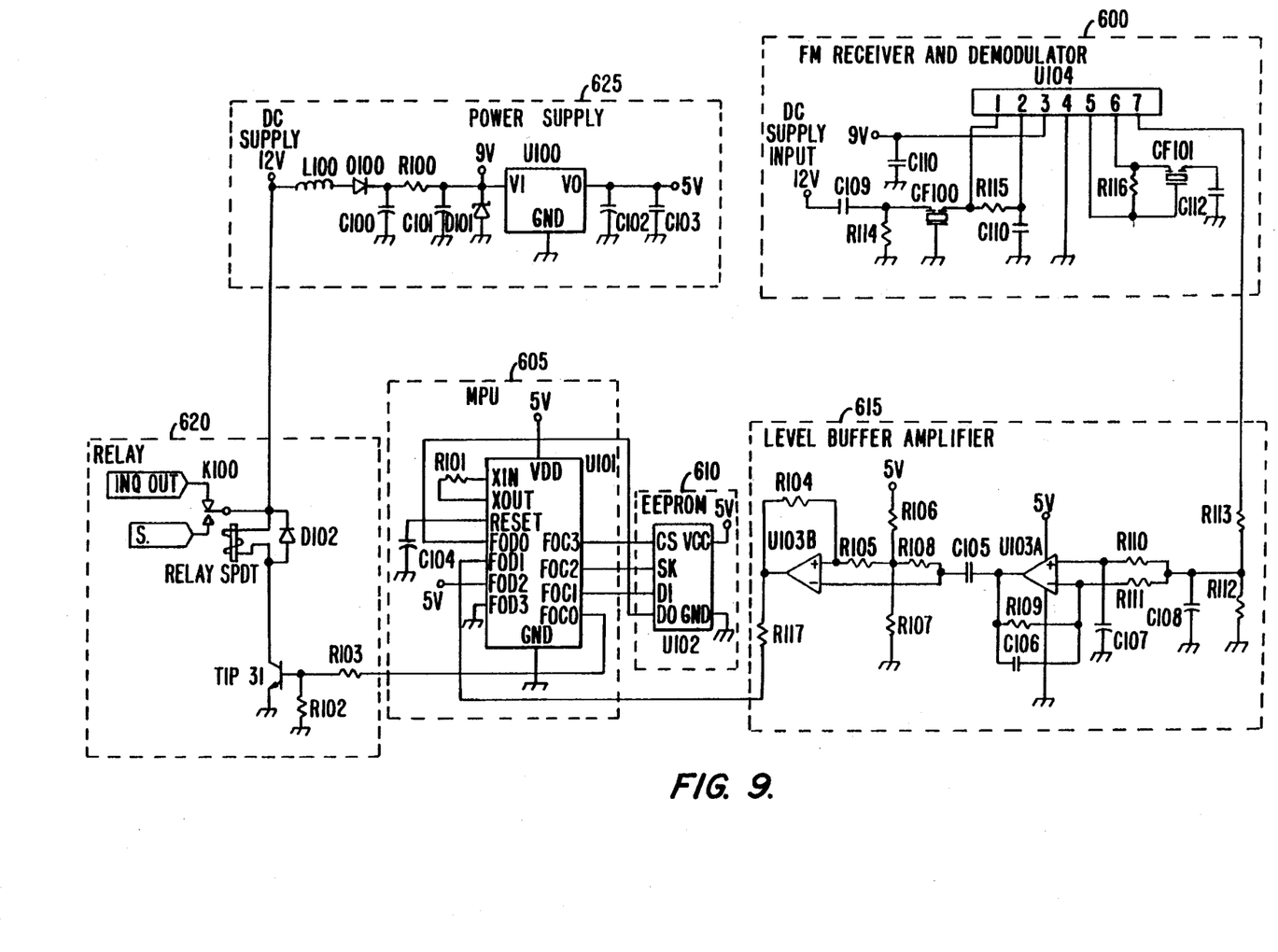
FIG. 9 is a schematic circuit diagram of the remote digital receiver.

FIG. 9 is a schematic circuit diagram of remote digital receiver 599. A DC 12 volt supply is fed through diode D100 which acts as a reverse polarity protector, and then is filtered by inductor L100 and capacitor C100. The filtered supply is then connected via resistor R100 to a 9 volt zener diode D101. This 9 volts is used by FM receiver and demodulator 600. The 9 volts is further regulated down to 5 volts via integrated circuit U100 (can be 78L05 or its equivalent) and capacitors C102 and C103 for the supply sent to level buffer amplifier 615, MPU 605 and EEPROM 610.

FM receiver and demodulator 600 is formed by an integrated circuit U104 (can be an AN5732) which amplifies and demodulates the FM signal present at its inputs. The FM signal from the DC power supply (12 V) lead is coupled via capacitor C109 and resistor R114 before being connected to input ceramic filter CF100. The filtered signal is passed to Pin 1 of integrated circuit U104 which has its gain controlled by resistor R115 and capacitor C110 at Pin 2. The demodulator frequency selection is provided by ceramic filter CF101 and resistor R116 between Pins 5 and 6. The demodulated low frequency signal is obtained at Pin 7 which is fed to the next function block 615. The low frequency signal from Pin 7 of the demodulator is connect via a low pass filter consisting of resistor R113, resistor R112 and capacitor C108, and connects to Pin 2 of amplifier U103A via resistor R111. The gain of the amplifier is set by the ratio of resistor R109 and resistor R111 while capacitor C106 is used to decrease the high frequency component. Resistor R110 and capacitor C107 at Pin 3 are used to offset the DC level from the demodulator. The amplified signal at Pin 1 is connected to Schmitt Trigger U103B for digital output voltage via capacitor C105. Resistors R106 and R107 form a voltage divider and provide the reference level for Schmitt Trigger via resistor R108. The hysterisis of the circuit is obtained via resistors R104 and R105. The output of the circuit switches to either high or low depending on the input signal at Pin 6. The output digital signal at Pin 7 is passed on to MPU 605.

MPU 605 is clocked internally and determined by a resister connected across Pins Xin and Xout. When powered up, MPU 605 resets with capacitor C104 connected to MPU 605 reset Pin. After resetting, MPU 605 executes its stored instructions. The system then loads the ID code and the increment code (x) from EEPROM 610 into the registers. The increment code is then incremented by 1 and the check code (y) is calculated. Then MPU 605 enters into a checking phase on the data supplied by level buffer amplifier 615. If a match is identified between the internal 40-bit codes and the received codes, then the increment code is saved back into EEPROM 610. Then one Pin of the MPU outputs goes high and drive NPN transistor Q100 to an ON state via resistors R103 and R102 which act as a voltage divider. The NPN transistor then drives output relay K100 which supplies power to the connected load (e.g., fuel pump, starter, ignition coil, etc.). MPU 605 finally enters a latched stage while maintaining the output relay in the ON position until the main power is interrupted.

Figure 10:
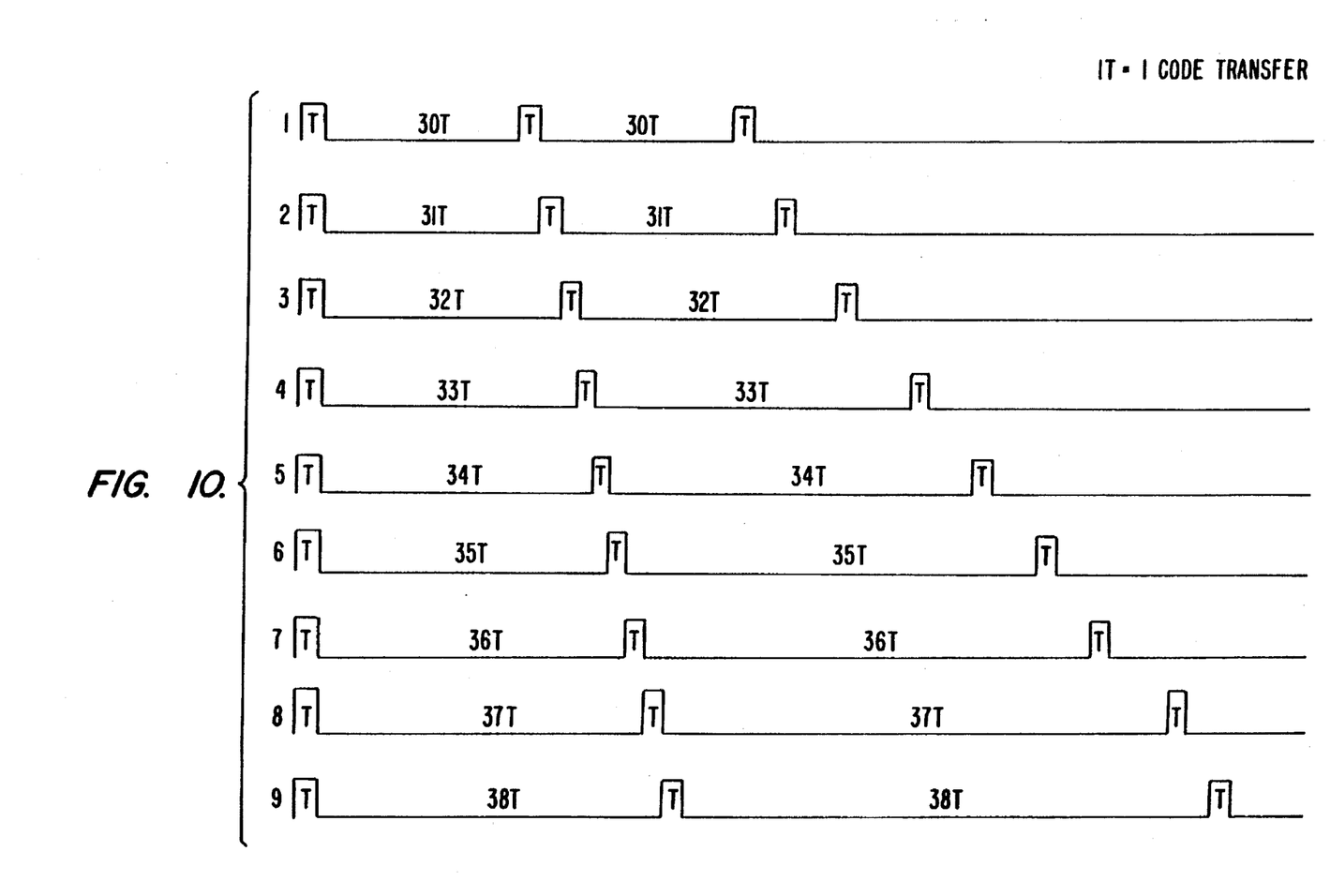

FIG. 10 is a timing diagram showing a preferred implementation of transmitters of alarm system 100. To reduce collisions of sensor information sent to CPU 115, each transmitter issues its data at a preset interval. These intervals are different for each sensor and effectively minimize overlap between data sent from different sensors. As shown, each series of signals, one from each transmitter, has an interval that ensures there is no collision for the second signal even when all start to transmit at one time. For an economical system, only CPU 115 includes both a transmitter and receiver, while other components include only a transmitter or a receiver.

In an alternative embodiment, alarm system 100 could be installed in a house. The house alarm system has the control unit and remote digital receivers described above in FIGS. 6–9. The digital receivers could be in existing apparatus (e.g., lights or doorbell) or could be in added apparatus (e.g., siren or device for sending an alarm warning to the local police). The process flow chart for the house alarm system is the same as FIG. 3, and the existing wiring in the house is used for transmitting signals between the various digital components of alarm system 100.

In a further alternative embodiment, the code word could be transmitted wirelessly through the air instead of through the existing wiring in the vehicle's or house's existing network of wiring. Similarly, for more elaborate systems, all units could be equipped with transceivers and the alarm system could implement a full-featured CSMA/CD protocol, such as that identified in IEEE 802.3 specification. Those skilled in the art can appreciate that other advantages can be obtained from the use of this invention and that modifications may be made without departing from the true spirit of the invention after studying this specification, drawings and following claims.

What is claimed is:

1. A theft deterring device using existing peripheral components, comprising:
    (a) a control system including a plurality of components, the plurality of components each having a memory, the control system entering an activated state when (i) the control system is in a second state of operation, (ii) a disruption occurs and (iii) a saved code saved in the memory of the plurality of components is not received by the plurality of components;
    (b) a signal network coupling the plurality of components to each other; and
    (c) a code generator coupled to the control system, the code generator generating a generated code periodically when the second state of operation changes to a first state of operation, the generated code being passed among the plurality of components only during the first state of operation, the generated code being based on the saved code, and the saved code being periodically saved in the memories of the plurality of components.

2. The theft deterring device of claim 1 wherein the control system is a digital control system and the plurality of components are a plurality of digital components.

3. The theft deterring device of claim 1 wherein the signal network sends signals through the existing wiring.

4. The theft deterring device of claim 1 wherein the signal network sends signals through the air.

5. The theft deterring device of claim 2 wherein the plurality of digital components includes a control unit and at least one remote digital receiver.

6. The theft deterring device of claim 5 wherein at least one of the remote digital receivers contains a battery supply which keeps the remote digital receiver in the second state of operation if a disruption to power occurs.

7. The theft deterring device of claim 5 wherein the remote digital receivers include at least one siren or at least one immobilizer.

8. The theft deterring device of claim 2 wherein the saved code is stored in an electrically erasable programmable read-only memory in each of the remote digital components.

9. The theft deterring device of claim 2 wherein the first state of operation is a disarmed state and the second state of operation is an armed state.

10. The theft deterring device of claim 5 wherein the remote digital receivers include at least one siren and at least one immobilizer.

11. A theft deterring device for a motorized vehicle, incorporated into the vehicle's existing wiring and using the vehicle's peripheral components, comprising:
    (a) a digital control system including a plurality of digital components, the plurality of digital components each having a memory, the digital control system entering an activated state when (i) the digital control system is in a second state of operation, (ii) a disruption occurs and (iii) a saved code saved in the memory of the plurality of digital components is not received by the plurality of digital components;
    (b) a signal network connecting the plurality of digital components to each other, the signal network sending signals through the vehicle's existing wiring;
    (c) a code generator coupled to the digital control system, the code generator generating a generated code periodically when a second state of operation changes to a first state of operation, the generated code being passed throughout the signal network only during the first state of operation, the generated code being based on the saved code, and the saved code being periodically saved in the memory of the plurality of digital components.

12. The theft deterring device of claim 11 wherein the plurality of digital components includes a control unit and at least one remote digital receiver.

13. The theft deterring device of claim 12 wherein the control unit comprises:
    (a) an alarm logic circuit for sending out an analog signal, the analog signal being dependent on input information;
    (b) a unique code generator for receiving the analog signal and for generating a unique code signal from the saved code stored in memory; and
    (c) a frequency modulator for receiving and amplifying the unique code signal, the unique code signal being then sent out on the existing wiring.

14. The theft deterring device of claim 13 wherein the remote digital receiver comprises:
    (a) a frequency demodulator for receiving and amplifying the unique code signal sent on the existing wiring and for converting the unique code signal into a data signal; and
    (b) a code decoder for receiving the data signal, for comparing it with the saved code in memory, and for generating an analog signal for removing the remote digital receiver from the activated state.

15. The theft deterring device of claim 13 wherein the input information is a signal from a sensor in the door, hood, trunk, or other places located in the vehicle with sensors.

16. The theft deterring device of claim 12 wherein at least one of the remote digital receivers contains a battery supply which maintains the remote digital receiver in the second state of operation if a disruption to power occurs.

17. The theft deterring device of claim 12 wherein the remote digital receivers include at least one siren or at least one immobilizer.

18. The theft deterring device of claim 12 wherein each of the remote digital receivers contains a time delay feature which can be independently programmed in each of the digital components to allow a variety of delays before the activated state of each of the digital components.

19. The theft deterring device of claim 11 wherein the first state of operation is a disarmed state and the second state of operation is an armed state.

20. The theft deterring device of claim 12 further comprising a means for polling the presence of each of the remote digital receivers.

21. The theft deterring device of claim 11 wherein the generated code generated periodically by the digital control system is a code word containing a unique identification code, an incrementing value and an output from a formula which uses the incrementing value as an input.

22. The theft deterring device of claim 12 wherein the remote digital receivers include at least one siren and at least one immobilizer.

23. A method of deterring theft using existing peripheral components, the method comprising:
  (a) detecting a disturbance, the disturbance being input signal;
  (b) recognizing a state of operation, the state of operation being either a first state of operation or a second state of operation;
  (c) comparing an entered code to a stored code; and
  (d) activating digital alarm components after a predetermined delay following the disturbance when the entered code does not match the stored code by inhibiting transmission of a digital disarm code word generated from the stored code to alarm components when the entered code fails to match the stored code.

* * * * *